Figure 1:
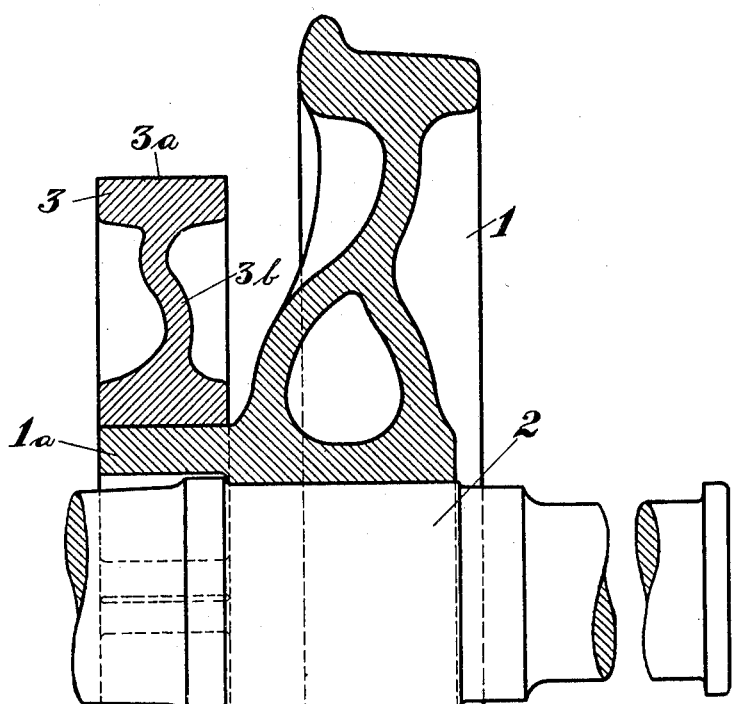

C. A. LINDSTRÖM.
COMBINED CAR AND BRAKE WHEEL.
APPLICATION FILED OCT. 12, 1908.

970,378.

Patented Sept. 13, 1910.

3 SHEETS—SHEET 1.

Witnesses
Frank E. Miller.
N. S. Bowling.

Inventor
Charles A. Lindström
By Harry A. Knight
Attorney

THE NORRIS PETERS CO., WASHINGTON, D. C.

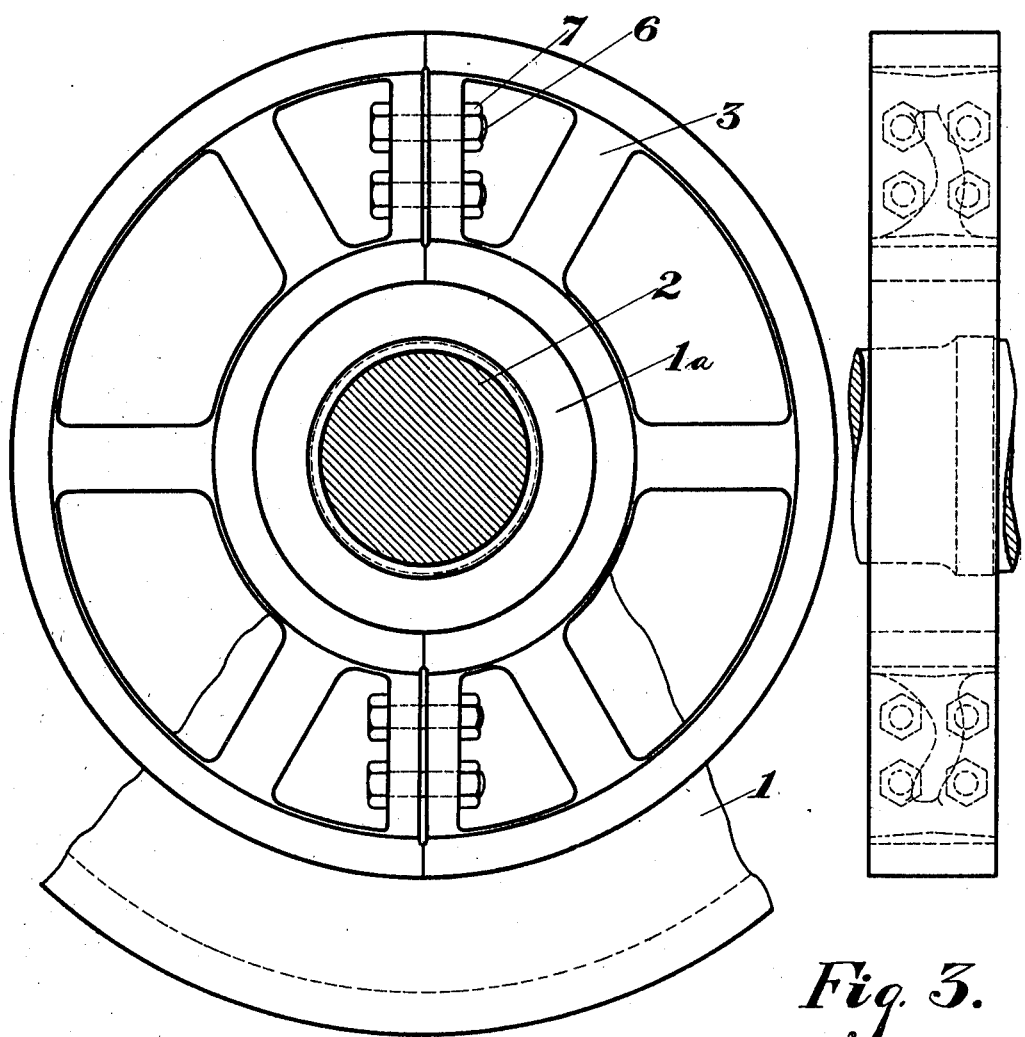

C. A. LINDSTRÖM.
COMBINED CAR AND BRAKE WHEEL.
APPLICATION FILED OCT. 12, 1908.

970,378.

Patented Sept. 13, 1910.
3 SHEETS—SHEET 3.

Witnesses
Frank C. Miller
N. S. Bowling

Inventor
Charles A. Lindström
By Harry A. Knight
Attorney

THE NORRIS PETERS CO., WASHINGTON, D. C.

UNITED STATES PATENT OFFICE.

CHARLES A. LINDSTRÖM, OF PITTSBURG, PENNSYLVANIA, ASSIGNOR TO PRESSED STEEL CAR COMPANY, OF PITTSBURG, PENNSYLVANIA, A CORPORATION OF NEW JERSEY.

COMBINED CAR AND BRAKE WHEEL.

970,378. Specification of Letters Patent. Patented Sept. 13, 1910.

Application filed October 12, 1908. Serial No. 457,219.

*To all whom it may concern:*

Be it known that I, CHARLES A. LINDSTRÖM, a citizen of the United States, residing at Pittsburg, North side, county of Allegheny, and State of Pennsylvania, have invented certain new and useful Improvements in Combined Car and Brake Wheels, of which the following is a full, clear, and exact description.

An object of the present invention is to provide improvements in that style of car wheel wherein an independent braking surface is employed. In car wheels of this type the independent braking surface is preferably located on the inner side of the car wheel so that the braking operation will not be affected by oil dripping from the journal box. This type of car wheels is especially advantageous because when the tread of the wheel becomes flattened from skidding through sudden application of the brakes, such skidding tendency will be reduced to or maintained at a minimum by reason of the brake shoes not coming in contact with the flattened portion of the wheel tread.

A specific object of the present invention is to provide means whereby such an independent braking surface may be removably applied to the car wheel, so that when the same becomes worn or damaged, the throwing of the car wheel into the scrap heap will not be necessitated but a new braking surface or wheel may be applied thereto instead.

A further specific object of the present invention is to so construct the braking wheel that the same may be removably mounted on the standard type of car wheel or an extension thereof.

A further specific object of this invention is to provide a suitable extension on the standard form of car wheel for reception of the braking wheel, and which will not interfere with the use of the standard form of axle, although the invention is comprehensive of a special type or shape of axle.

A further specific object of the invention is to provide a braking surface suitable for use in connection with the standard types or forms of brake shoes, although a special shape or surface and shoe, if desired, is also contemplated by the invention.

Referring to the drawings in which like reference characters refer to like parts, and in which—

Figure 1 is a sectional view of a car wheel; Fig. 2 is a partial elevation of the same showing modified form of mounting for the supplemental wheel; Fig. 3 is a plan view of the supplemental wheel shown in Fig. 2; Figs. 4, 5, 6 and 7 are views showing slight modifications in structure.

Referring now in detail to the drawings, 1 represents a car wheel of standard shape mounted on car axle 2 and provided, as shown in Fig. 1, with an inwardly extended hub $1^a$, cylindrical in shape and provided with a bore or hollow portion slightly larger in diameter than a section of the axle 2 in the same vertical plane to permit of application of the car wheel 1 to the standard shape of axle 2.

Figure 4:
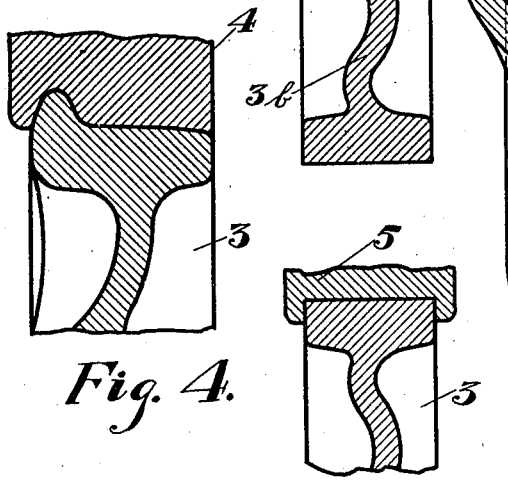
Figure 5:
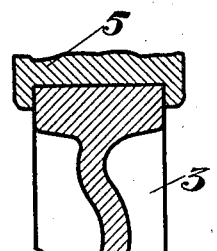

In Fig. 1, 3 is a braking wheel also provided with a hub having a bore of greater diameter than a section of the axle in the same vertical plane and being shown pressed onto the hub $1^a$, this being the preferred form of mounting braking wheel 3 on car wheel 1, although other forms are illustrated in the drawings and hereinafter described. I claim invention in this specific form of mounting the braking wheel 3 on the car wheel 1. Wheel 3 is provided with a suitably shaped tread $3^a$ adapted to contact with a brake shoe of any shape. Tread $3^a$ of wheel 3 may be shaped as shown in Fig. 4, that is, substantially similar in shape to the tread of the car wheel 1 to accommodate a common shape of brake shoe 4; or, if desired, wheel 3 may be provided with a plain tread as shown in Figs. 1 and 5, and brake shoe 5 may be formed to fit same as shown in Fig. 5.

In Fig. 2 is shown a modified method of mounting the wheel 3 on the hub $1^a$ of the car wheel 1, wherein the wheel 3 is shown divided, the sections of the wheel being secured at suitable points through means of studs or bolts 6 and nuts 7. The spokes $3^b$ of wheel 3 may, of course, be of suitable shape to provide for expansion and contraction of the metal.

Figure 6:
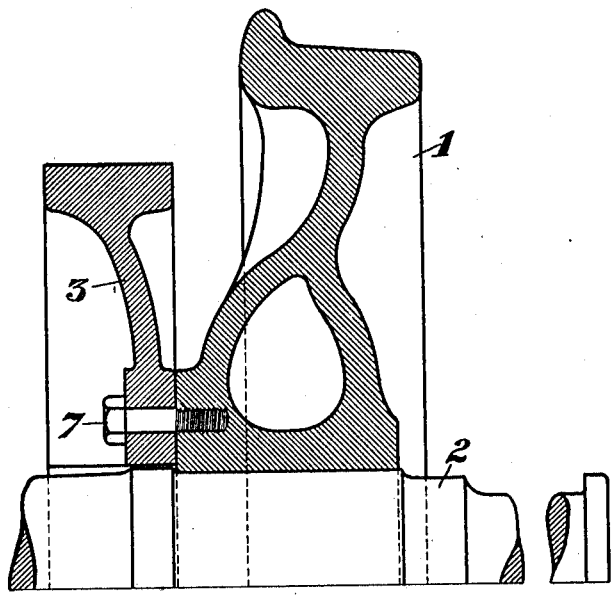
Figure 7:
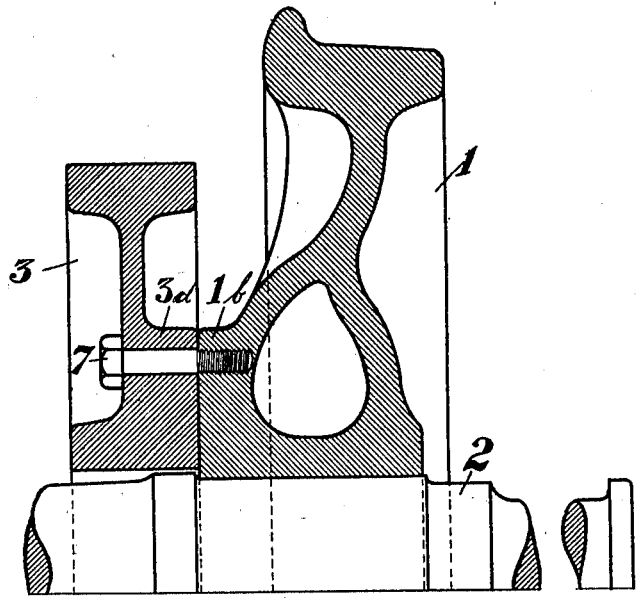

If desired, the wheel 3 may be mounted on car wheel 1 in a manner shown in Fig. 6, where the standard shape of car wheel is not departed from. This mounting consists in forming wheel 3 with a hub $3^c$ which abuts the hub $1^a$ of the car wheel. Hub $1^a$ is here perforated and threaded to receive bolts 7, of suitable number and location, which hold wheels 3 and 1 together. This last illustrated method of mounting the braking wheel may be carried out further by forming bosses 1$^b$, 3$^d$ on the respective wheels to take the bolts 7 at points farther removed from the wheel centers, thus decreasing the leverage on bolts 7 and more firmly securing the two wheels together.

In all the forms illustrated it will be noted that the bore or hollow portion of the braking wheel 3 is of greater diameter than the bore or hollow portion of the car wheel 1, which specific feature I claim is novel and advantageous since it permits the use of the standard shape of axle which has an enlargement or collar in a vertical plane immediately adjacent the inner face of the car wheel.

Having thus described my invention, the following is what I claim as new therein and desire to secure by Letters Patent:—

1. A car wheel having a hub with an elongation with its hollow portion slightly larger in diameter than a section of the axle in the same plane.

2. A car wheel having a hub with an elongation out of contact with the axle and a braking wheel mounted on said elongation.

3. In combination with a car wheel, a brake wheel mounted on the inner side of said car wheel, and having a hub with a bore of greater diameter than the bore in the hub of said car wheel.

4. A car wheel having a hub with an elongation on its inner side, said elongation having a bore slightly larger in diameter than a section of the car axle in the same plane.

5. A car wheel having an extended cylindrical hub and a brake wheel pressed onto said hub.

6. A car wheel having an inwardly extended cylindrical hub and a brake wheel pressed onto said hub.

In testimony whereof I affix my signature, in presence of two witnesses.

CHARLES A. LINDSTRÖM.

Witnesses:
T. J. JONES,
THOMAS B. DENHAM.